United States Patent
Wanderlich

[19]

[11] Patent Number: 6,028,531
[45] Date of Patent: Feb. 22, 2000

[54] TERMINAL UNITS FOR A MOBILE COMMUNICATIONS SYSTEM

[76] Inventor: Ronald E. Wanderlich, P. O. Box 1402, Hampton, N.H. 03842

[21] Appl. No.: 08/955,236

[22] Filed: Oct. 21, 1997

Related U.S. Application Data

[60] Provisional application No. 60/028,898, Oct. 21, 1996.

[51] Int. Cl.[7] ....................................................... H04B 1/08
[52] U.S. Cl. ................................ 340/825.44; 340/825.44; 340/825.47; 340/384.2; 340/407.1; 601/70; 601/72
[58] Field of Search .......................... 340/825.44, 825.46, 340/825.47, 384.2, 407.1; 601/70, 72

[56] References Cited

U.S. PATENT DOCUMENTS

| | | |
|---|---|---|
| 3,549,920 | 12/1970 | Tavel . |
| 3,618,070 | 11/1971 | Kagan . |
| 4,380,759 | 4/1983 | Sulkoski ................................ 340/407.1 |
| 4,878,489 | 11/1989 | Kamayachi . |
| 4,879,759 | 11/1989 | Matsumoto et al. . |
| 4,918,438 | 4/1990 | Yamasaki . |
| 4,967,696 | 11/1990 | Tobias . |
| 5,181,023 | 1/1993 | Fujii . |
| 5,229,744 | 7/1993 | Ogura ................................... 340/825.46 |
| 5,293,161 | 3/1994 | MacDonald et al. . |
| 5,353,017 | 10/1994 | Suzuki et al. ........................ 340/825.46 |
| 5,471,103 | 11/1995 | Fujii . |
| 5,573,499 | 11/1996 | McAllister ................................. 601/70 |
| 5,782,779 | 7/1998 | Kilgore ....................................... 601/70 |
| 5,787,168 | 7/1998 | Lien ..................................... 340/825.46 |
| 5,815,077 | 9/1998 | Christiansen .......................... 340/384.2 |

*Primary Examiner*—Brian Zimmerman
*Assistant Examiner*—Yves Dalencourt
*Attorney, Agent, or Firm*—O'Connell Law Firm

[57] ABSTRACT

A terminal unit of a mobile communications system for providing a non-numeric annunciation of an incoming mobile communications signal with a terminal unit housing, a mechanism for coupling the terminal unit housing to an incoming mobile communications signal receiver, a normally inactive non-numeric annunciator operably associated with the terminal unit housing, and a mechanism for coupling the non-numeric annunciator to a mobile communications signal receiver. The mobile communications terminal unit may be constructed for use as a personal vibrator of the type used on a human body with a user engaging portion that may comprise a smooth-ended rod, a smooth plug, or a vibratory aperture. The mobile communications terminal unit alternatively may be constructed with an acoustic or a tactile annunciator for practicing a method of transmitting a command signal to a domestic animal.

14 Claims, 3 Drawing Sheets

TERMINAL UNITS FOR A MOBILE COMMUNICATIONS SYSTEM

This patent claims the benefit of United States provisional application number 60/028,898, filed Oct. 21, 1996.

FIELD OF THE INVENTION

The present invention resides in the field of mobile communications. More particularly, it relates to terminal units for a mobile communications system that provide a non-numeric annunciation of a receipt of a mobile communications signal.

BACKGROUND OF THE INVENTION

Mobile communications have become exceedingly commonplace in recent years. Those taking advantage of such systems presently have a multiplicity of choices regarding the type of terminal unit to be employed. For example, consumers may choose from portable cellular telephones, paging receivers, and even combinations of the two. With regard to paging receivers, one can opt from among pagers with diverse alerting signals such as audible, visual, and tactile (i.e., vibratory).

Furthermore, the prior art discloses pagers with alerting signals which selectively or automatically vary in type or intensity. To demonstrate, U.S. Pat. No. 4,918,438 to Yamasaki discloses a pager having the ability to alternate automatically between tactile annunciation and audible annunciation. Additionally, U.S. Pat. No. 5,293,161 to MacDonald et al. presents a pager which permits a user to vary selectively the vibrating pager's frequency of vibration. As the above is intended to make clear, even a cursory review of the prior art reveals that many inventive terminal units of mobile communications systems are known to the art.

Notwithstanding the unchallenged usefulness of the inventions specified and alluded to above and herein, an invention presenting previously-unexploited uses of mobile communications technology undoubtedly would represent a marked advance in the art.

SUMMARY OF THE INVENTION

With the foregoing in mind, the present invention has a principal object of broadening the known uses of mobile communications systems by providing terminal units for such systems of unique mechanism, performance, and use to employ mobile communications to function beyond the rudimentary relaying of numeric or voice messages.

In accordance with that principal object, another object of the invention is to provide a mobile communications terminal unit that may be used as a personal vibrator thereby permitting a unique form of interpersonal communication.

A further object of the invention is to permit remote communication with domestic animals through an animal communication terminal unit.

In its most basic form, the invention comprises a terminal unit of a mobile communications system for providing a non-numeric annunciation of an incoming mobile communications signal (i.e., a page). A means for coupling a terminal unit housing to a means for receiving an incoming mobile communications signal (i.e., a paging receiver) may comprise a selective coupling mechanism wherein a paging receiver is received into a receiving portion in the terminal unit housing in a mating relationship. Alternatively, the means for receiving an incoming mobile communications signal may be disposed within the terminal unit housing and retained by a coupling means.

One embodiment of the present invention comprises a terminal unit of a mobile communication system for use as a personal vibrator of the type used on a human body. By its size and shape, the terminal unit permits a form of interpersonal communication heretofore unrealized. The terminal unit housing comprises has an exterior surface with a user engaging portion. The non-numeric annunciator means comprises a means operably associated with the terminal unit housing for producing a vibratory annunciation for vibrating at least the user engaging portion of the terminal unit housing in response to a receipt of a paging signal by an operably associated mobile communications signal receiving means. One should note, of course, that the non-numeric annunciator means may be supplemented by a numeric annunciator means as is common with most prior art paging receivers. In any event, under this embodiment, a mobile communications paging signal sender can remotely induce a vibration of the user engaging portion of the terminal unit housing to enable a mobile communications signal receiver to apply the user engaging portion of the terminal unit housing to a human body to provide the human body with a vibratory sensation.

In such an embodiment, the user engaging portion of the terminal unit housing may be an elongate cylindrical section with a rounded nose coupled to an end thereof to present a user engaging portion shaped like a smooth-ended rod. The elongate cylindrical section may be straight, curved, or textured. The means for producing a vibratory annunciation vibrates the elongate cylindrical section and the rounded nose in response to a receipt of a paging signal by an operably associated mobile communications signal receiving means. As such, a vibrating user engaging portion can be applied to a human body including around and into orifices of the human body. In light of the conditions of its use, the user engaging portion ideally is waterproof so that the user engaging portion can be exposed to liquids safely. Alternatively or additionally, the user engaging portion of the terminal unit housing may comprise an aperture lined with resilient material whereby a mobile communications signal receiver can insert an extremity of a human body into the aperture in the terminal unit housing in a snug mating relationship to provide the extremity of the human body with a vibratory sensation. Still another alternative user engaging portion may comprise a smooth plug.

With any of the user engaging portions, it may be most preferable if the terminal unit further comprises a means for enabling a mobile communications signal sender to produce a variance in the vibratory annunciation produced by the means for producing a vibratory annunciation. Such a means would allow a mobile communications signal sender to produce an excitation pattern of the vibratory annunciation wherein the amplitude and/or frequency of the vibratory annunciation may be varied with time.

In another embodiment, the mobile communications terminal unit may be constructed for use in a method for transmitting a command signal to a domestic animal (e.g., any animal that can be trained to respond to commands). The mobile communications terminal unit may be attached to a domestic animal by any suitable means such as by a collar. The non-numeric annunciator means may comprise an acoustic annunciator for producing an acoustic annunciation signal in response to a mobile communications signal being received by the mobile communications signal receiving means whereby a mobile communications signal sender can send an acoustic command signal to a domestic animal that wears the mobile communications terminal unit. Alternatively, the non-numeric annunciator means may comprise a means for producing a tactile annunciation such as a vibratory annunciation. In a most preferred embodiment, the mobile communications terminal unit further comprises a means operably associated with the mobile communications terminal unit for enabling a mobile communications signal sender to produce a variance in the non-numeric annunciation produced by the non-numeric annunciator means. With this, the mobile communications signal sender can produce a command pattern of the non-numeric annunciation. As a result, a variety of command signals can be transmitted to a domestic animal that wears the mobile communications terminal unit.

One skilled in the art will realize that the foregoing discussion broadly outlines the more important features of the invention to enable a better understanding of the detailed description that follows and to instill a better appreciation of the inventor's contribution to the art. Before an embodiment of the invention is explained in detail, it must be clear that the following details of construction, descriptions of geometry, and illustrations of inventive concepts are mere examples of possible manifestations of the invention.

DETAILED DESCRIPTION

Figure 1:
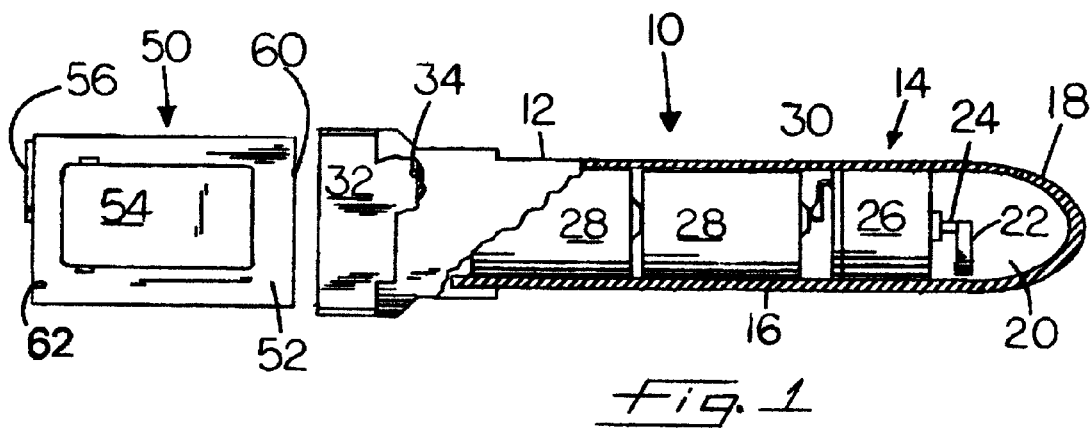
FIG. 1 is a partially-sectioned elevational view of a terminal unit of a mobile communications system for use as a personal vibrator.

Turning to the accompanying figures, a terminal unit of a mobile communications system is indicated generally at 10 in each figure. Looking more particularly to FIG. 1, there is shown in partial cross-section a terminal unit 10 of a mobile communications system for use as a cordless vibrator of the type used on a human body. In the embodiment of FIG. 1, the mobile communications terminal unit 10 is intended to be used in conjunction with a paging receiver 50 that acts as a means for receiving a mobile communications paging signal. The personal vibrator terminal unit 10 has a terminal unit housing 12. The exterior surface of the terminal unit housing 12 has a user engaging portion, indicated generally at 14, that comprises an elongate cylindrical section 16 and a rounded nose 18 coupled to an end of the cylindrical section 16 so that the user engaging portion 14 presents a smooth-ended rod shape. Since it is the essence of the invention that the user engaging portion 14 of the personal vibrator terminal unit 10 be used on a human body, both externally and internally, ideally the user engaging portion 14 should be adapted for safe entry into bodily orifices and the like. Therefore, it should be durable, washable, and waterproof For example, an appropriately constructed unitary plastic tube in the shape of the user engaging portion 14 may be most suitable.

The terminal unit housing 12 has an open inner volume 20. In the open inner volume 20, there is an eccentric disk 22 that is rotated about a shaft 24 that is turned by a motor 26 that is powered by batteries 28 via an electric contact 30. Taken together, these elements comprise a normally inactive non-numeric annunciator means in the form of a means for producing a tactile (i.e., vibratory) annunciation, indicated generally at 11, of an incoming paging signal by vibrating at least the user engaging portion 14 of the terminal unit housing 12.

The personal vibrator terminal unit housing 12 has a receiving channel 32 into which may be received in a mating fashion a means for receiving an incoming mobile communications signal such as the paging receiver 50 whereby the receiving channel 32 is a selective coupling mechanism that acts as a means for coupling the terminal unit housing 12 to the paging receiver 50. Inserting the paging receiver 50 into the receiving channel 32 establishes a mechanical connection between the paging receiver 50 and the personal vibrator terminal unit 10. As such, the receiving channel 32 acts as a means for coupling the non-numeric annunciator means to a means for receiving a mobile communications signal in the form of the paging receiver 50. The receiver 50 has a main body 52, a switch 56, lamp 62, speaker holes (not shown), and a clip 54. When the paging receiver 50 is received into the receiving channel 32, first connecting terminals 60 in the paging receiver 50 contact second connecting terminals 34 in the personal vibrator terminal unit housing 12 to establish an operable electrical connection between the paging receiver 50 and the personal vibrator terminal unit 10.

Under the arrangement described above, one taking advantage of the present invention can enjoy a method of interpersonal communication heretofore unrealized. By combining the known technologies of a paging receiver 50 with the personal vibrator terminal unit 10, the receipt of a paging signal by the paging receiver 50 would employ the operable connection between the first connecting terminals 60 and the second connecting terminals 34 to cause the batteries 28 to power the motor 26 to rotate the shaft 24 to spin the eccentric disc 22. This activation of the normally inactive vibrator means 11 would induce rapid rotation of the eccentric disc 22 to produce vibrations for vibrating at least the user engaging portion 14.

Figure 2:
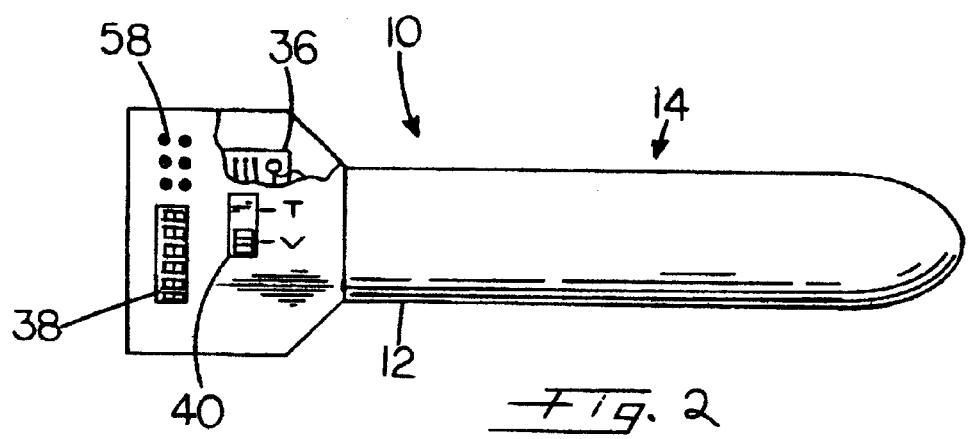
FIG. 2 is an elevational view of an alternative embodiment of the mobile communications terminal unit for use as a personal vibrator.
Figure 3:
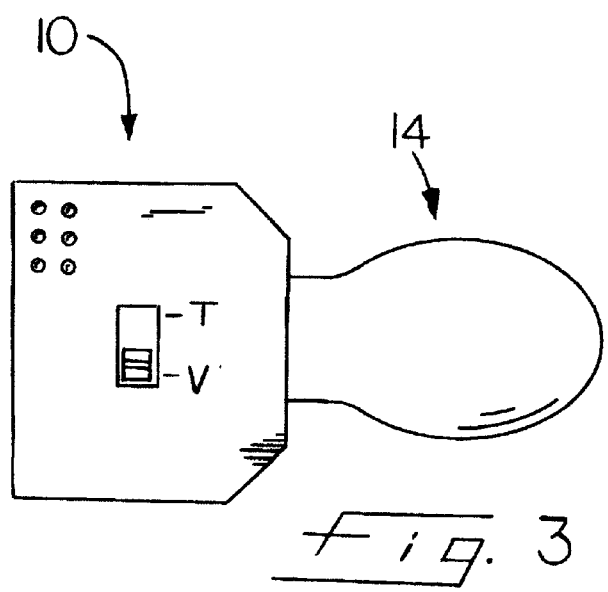
FIG. 3 is an elevational view of another alternative embodiment of the mobile communications terminal unit for use as a personal vibrator.

As one skilled in the relevant arts will realize, much of the present invention may be constructed with reference to devices known to the prior art. For example, the user engaging portion 14 and the normally inactive vibrator means 11 may be similar to that of any personal vibrator for use on the human body—the shape shown in FIGS. 1 and 2 is merely exemplary. For example, the user engaging portion 14 need not be straight. It may be curved (not shown) or contoured (also not shown). Alternatively, the user engaging portion 14 may comprise a shorter, plug shape as is shown in FIG. 3.

In any event, the normally inactive vibrator means 11, shown in FIG. 1, takes advantage of much of the vibrating mechanism disclosed in U.S. Pat. No. 3,549,920 for a "Cordless Electric Vibrator for Use on the Human Body." The disclosure of that patent is incorporated herein by reference. Similarly, the paging receiver 50 could be any suitable device which is revealed by the prior art. Particular reference may be had to U.S. Pat. No. 4,879,759 for a "Holding Structure for a Paging Receiver Having Extra Functions," which is incorporated herein by reference. With such devices in mind and knowing the contents of the present disclosure, one skilled in the art undoubtedly could construct a multiplicity of embodiments of the present personal vibrator terminal unit invention.

FIG. 2 depicts an alternative embodiment of the invention wherein the personal vibrator terminal unit again is indicated generally at 10. Again the unit has a terminal unit housing 12 with a user engaging portion 14 that comprises a smooth-ended rod. However, in this embodiment, the personal vibrator terminal unit 10 has a self-contained signal receiving means that comprises a single chip central processing unit (CPU) 36 so that the essential functions of the paging receiver 50 of FIG. 1 are performed by the personal vibrator terminal unit 10 itself As with a traditional paging receiver 50, the receiving means 36 of the present embodiment essentially includes a means for receiving a paging signal which includes a page number, memory means for storing a page number which is assigned to the receiver, decoder means for comparing the page number included in the paging signal received with the page number which is stored in the memory means and for producing a detection/annunciation activation pulse if the two page numbers coincide. Under such a construction, a paging receiver 50 is not necessary since the personal vibrator terminal unit 10 combines the mechanisms of a vibrator for use on and in the human body with a paging receiver 50. Incorporating many characteristics of traditional paging receivers, the embodiment shown in FIG. 2 has speaker holes 58, a numeric display 38, and a tone/vibrate selector switch 40. As a result, the personal vibrator terminal unit 10 may be used as a traditional audible pager by switching the switch 40 to T for "tone," and the personal vibrator terminal unit 10 alternatively may be used as a vibrator for use on and in the human body by switching the switch 40 to V for "vibrate." As one might surmise, when the normally inactive vibratory means 11 is activated by the receiving means's 36 receiving a paging signal, the substantially waterproof vibrating user engaging portion 14 may be applied virtually to any portion of a human body.

Figure 4:
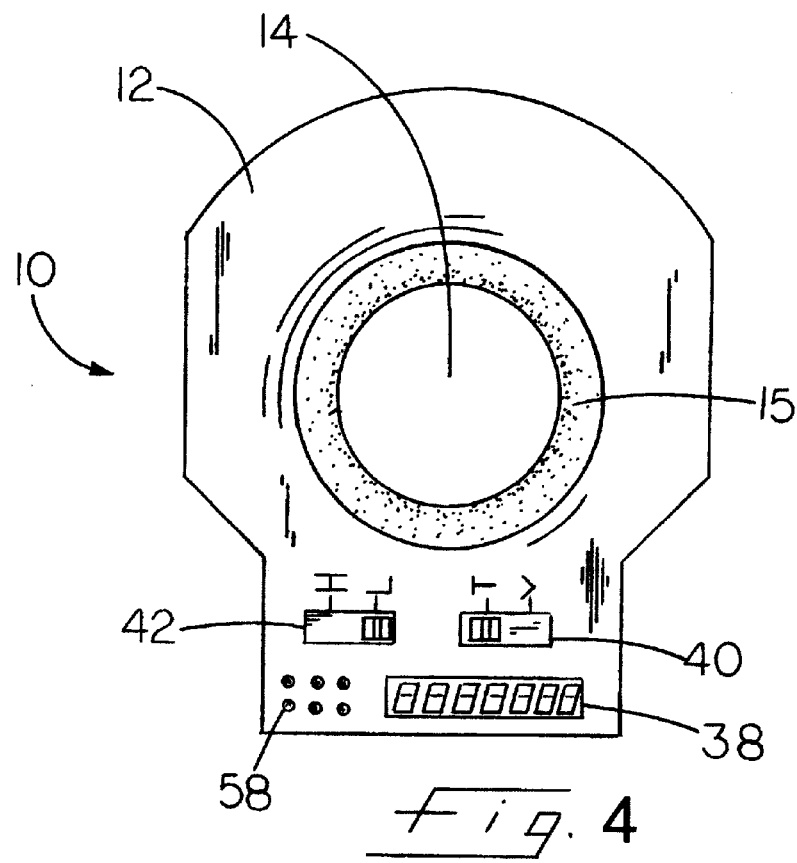
FIG. 4 is an elevational view of yet another embodiment of the mobile communications terminal unit for use as a personal vibrator.

A still further embodiment of the invention is shown in FIG. 4 where the personal vibrator terminal unit is again shown at 10. The unit 10 has a terminal unit housing 12 which has a user engaging portion 14 comprising a vibratory aperture, also indicated at 14, extending through the housing. In this preferred embodiment, the vibratory aperture 14 is lined with a layer of resilient material 15. The personal vibrator terminal unit 10 again has speaker holes 58, a numeric display 38, and a tone/vibrate selector switch 40. The personal vibrator terminal unit 10 further includes a vibration intensity selector switch 42 that permits a user to select a desired frequency of vibration of the user engaging portion 14. Particularly relevant to this and other portions of the specification is U.S. Pat. No. 5,293,161 for a "Selective Call Receiver Having a Variable Frequency Vibrator" which is specifically incorporated into this disclosure by reference. Of course, a selector switch (not shown) could be provided to permit a user to select a desired amplitude of vibration of the user engaging portion 14. In such an embodiment, a mobile communications signal receiver can insert an extremity of a human body into the vibratory aperture 14 in the terminal unit housing 12 in a snug mating relationship to provide the extremity of the human body with a vibratory sensation.

Figure 5:
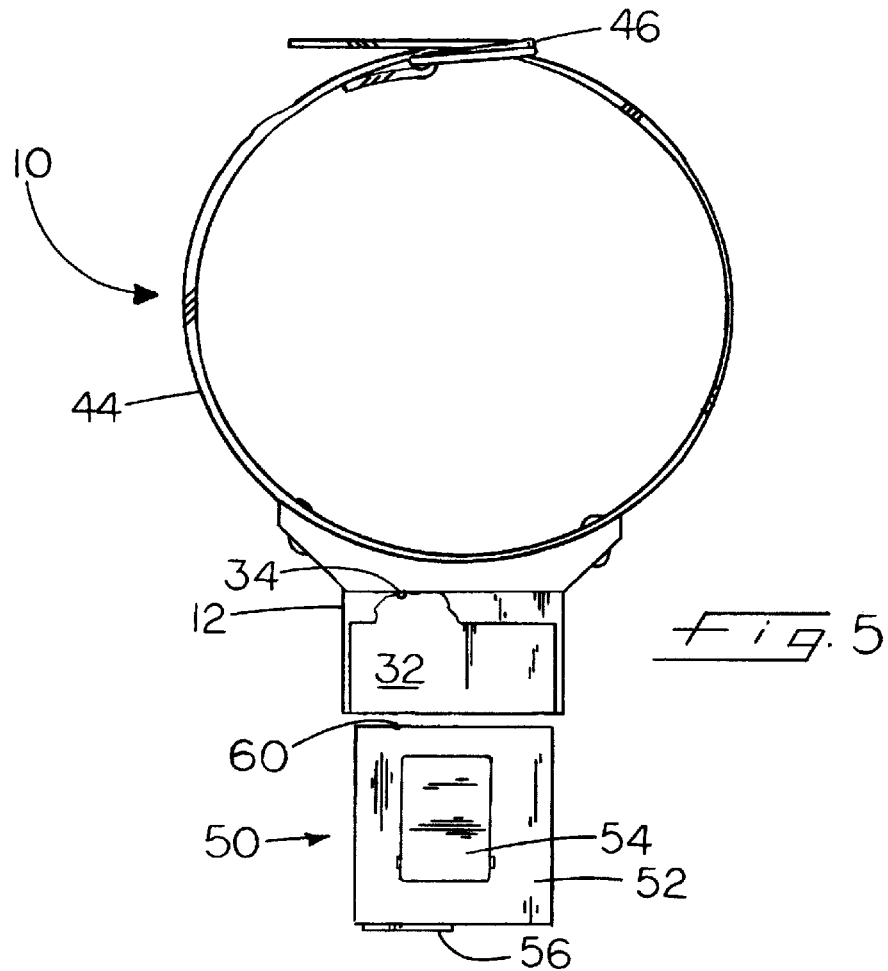
FIG. 5 is an elevational view of a terminal unit of a mobile communications system for use in transmitting a command signal to a domestic animal.
Figure 6:
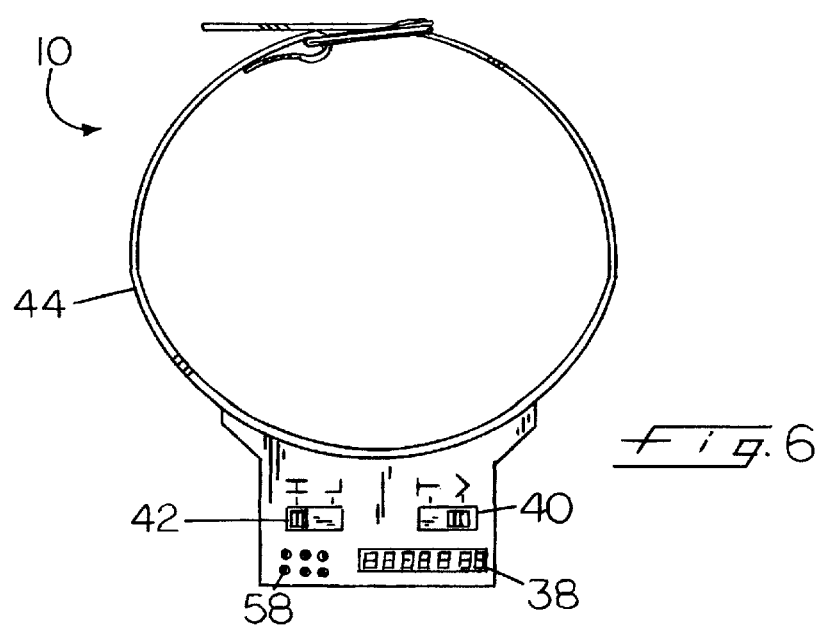
FIG. 6 is an elevational view of a terminal unit of another embodiment of the mobile communications system for use in transmitting a command signal to a domestic animal.

An alternative embodiment of the invention is shown in FIGS. 5 and 6 wherein the mobile communications terminal unit 10 is constructed for use in transmitting a command signal to a domestic animal. One should note that the mobile communications terminal unit 10 can be employed with a means for producing a tactile annunciation (i.e., a normally inactive vibratory means 11) to transmit a tactile command signal or with a means for producing an acoustic annunciation (i.e., through speaker holes 58) to transmit an acoustic command signal. Although it is contemplated that the terminal unit 10 be used with many different types of domestic animals, the embodiments depicted in FIGS. 5 and 6 and described below are best suited for those animals that commonly wear collars, such as dogs. Therefore, the animal communication terminal unit, shown generally at 10, has a collar 44 with an attaching buckle 46 for allowing the mobile communications terminal unit 10 to be attached to a domestic animal. In each embodiment, the animal communication terminal unit 10 has a terminal unit housing 12. FIG. 5 depicts an embodiment similar to the personal vibrator terminal unit 10 shown in FIG. 1 in that the animal communication terminal unit 10 is intended to work in conjunction with a traditional paging receiver 50. Accordingly, much of the discussion for the personal vibrator terminal unit 10 is equally applicable here. Likewise, the animal communication terminal unit 10 shown in FIG. 6 corresponds to the personal vibrator terminal unit 10 shown in FIG. 2 in that the receiving means 36 is incorporated permanently within the housing 12. As with previously described embodiments, the animal communication terminal unit 10 includes speaker holes 58, numeric display 38, vibration intensity selector switch 42, and tone/vibrate selector switch 40.

As was set forth above, whether the receiving means employed by a given embodiment is a traditional paging receiver 50 or a receiving means self-contained by the terminal unit 10 housing 12, the receiving means 36 includes essentially a means for receiving a paging signal which includes a page number (i.e., a dialed telephone number), memory means for storing a page number which is assigned to the receiver (i.e., a pager telephone number), decoder means for comparing the page number included in the paging signal received with the page number which is stored in the memory means and producing a detection/annunciation activation pulse if the two page numbers coincide. Such a receiving means 36 would activate a mobile communications terminal unit 10 by a detection/annunciation activation pulse to cause the terminal unit 10 to annunciate in a selected manner: the personal vibrator terminal unit 10 would annunciate by vibrating while the animal communication terminal unit 10 would annunciate by vibration, auditory signal via an acoustic annunciator such as the speaker holes 58, or other appropriately communicating manner.

Although the above-described forms of communication/activation are unique to the art, it is contemplated further to employ such means as the decoder means of the receiving means 36 as a means for enabling a mobile communications signal sender to producing a variance in the non-numeric annunciation by giving effect to a series of paging signal indicia or commands beyond those merely representing the number assigned to the receiver means. Such an additional series of paging signal commands may be given the effect of an annunciation pattern in those manifestations of the invention which exhibit annunciation signals such as tactile or auditory signals. For example, one seeking remote communication with a terminal unit 10 according to the present invention would first enter into a remote paging transmitter (i.e., a telephone) the page number assigned to the receiving means 36. In addition to that assigned number, the user could enter a series of characters such as numbers which also would be decoded by the decoder means to affect the character of the annunciation exhibited by the annunciating means (i.e., the normally-inactive vibrator means 11) such as the length, intensity, or frequency of the vibratory or auditory annunciation.

To demonstrate, where vibratory annunciation is employed, the numeric indicia of a remote paging transmitter might be preprogrammed to produce particular annunciation characteristics. For example, the chart below depicts the vibration characteristics which might be assigned to the numbers 1 through 9:

1  High amplitude, low frequency vibration, 1 second in duration;
2  High amplitude, low frequency vibration, 2 seconds in duration;
3  High amplitude, low frequency vibration, 3 seconds in duration;
4  High amplitude, low frequency vibration, 4 seconds in duration;
5  High amplitude, low ftequency vibration, 5 seconds in duration;
6  Low amplitude, high frequency vibration, 1 second in duration;
7  Low amplitude, high frequency vibration, 2 seconds in duration;
8  Low amplitude, high frequency vibration, 3 seconds in duration; and
9  Low amplitude, high frequency vibration, 4 seconds in duration.

An annunciation pattern, controlled remotely by a mobile communications signal sender's selective input of an annunciation series of indicia, would enable a form of sensory communication via a mobile communications system still more unique than that disclosed earlier in this specification. By way of example, one sending a paging signal to an animal communication terminal unit 10 employing the numeric characteristics assigned above could establish a command pattern of annunciation by supplementing the assigned number of the receiving means 36 with a first character of 3 which would induce a high amplitude vibration lasting three seconds and a second character of 6 which would induce a low amplitude, high frequency vibration lasting one second. By proper training, such a vibratory command pattern might instruct an animal to return to its owner or to retrieve a hunter's prey. Obviously, similar pattern schemes would permit one to establish a communication pattern for other embodiments of the invention such as an excitation pattern for the personal vibrator terminal unit 10.

In summary, it will be seen that the present invention provides a series of embodiments of terminal units 10 of unique mechanism, performance, and use that resultantly broaden the known uses of mobile communications systems. For example, the personal vibrator terminal unit 10 permits a heretofore unrealized form of interpersonal communication. Similarly, an animal communication terminal unit 10 permits a user to use telecommunications to communicate effectively with a domestic animal, possibly employing a command pattern, over long distances.

In conclusion, one must note that although the invention has been shown and described with reference to certain preferred embodiments, those skilled in the art can conceive of alternative embodiments that could incorporate the major features and advantages of the invention without incorporating all of the features included in the preferred embodiments. With this possibility in mind, the following claims and others which will ultimately be included herewith are be intended to define the scope of protection to be afforded this inventor, and the claims shall be deemed to include equivalent constructions which are within the spirit and scope of the present invention.

I claim:

1. A terminal unit of a mobile communications system for providing a non-numeric annunciation of a mobile communications signal, the terminal unit comprising:
    a terminal unit housing;
    a means for coupling the terminal unit housing to a means for receiving a mobile communications signal;
    a normally inactive non-numeric annunciator means operably associated with the terminal unit housing for non-numerically annunciating a receipt of the mobile communications signal, and
    a means for coupling the non-numeric annunciator means to a means for receiving a mobile communications signal;
    wherein the mobile communications terminal unit is constructed for use as a personal vibrator of the type used on a human body wherein the terminal unit housing comprises an exterior surface with a user engaging portion wherein the non-numeric annunciator means comprises a means operably associated with the terminal unit housing for producing a vibratory annunciation for vibrating at least the user engaging portion of the terminal unit housing in response to a receipt of the mobile communications signal by a means for receiving a communications signal whereby one sending the mobile communications signal can employ mobile communications to induce a vibration of the user engaging portion of the terminal unit housing thereby enabling one receiving the mobile communications signal to apply the user engaging portion of the terminal unit housing to a human body to provide the human body with a vibratory sensation; and
    wherein the user engaging portion of the terminal unit housing comprises an elongate cylindrical section and a rounded nose coupled to an end of the cylindrical section to present a user engaging portion shaped like a smooth-ended rod and wherein the means for producing a vibratory annunciation vibrates the elongate cylindrical section and the rounded nose in response to a receipt of the mobile communications signal by a means for receiving a mobile communications signal thereby enabling one receiving the mobile communications signal to apply the user engaging portion to a human body including around and into orifices of the human body.

2. The mobile communications terminal unit of claim 1 wherein the user engaging portion is waterproof whereby one receiving the mobile communications signal can expose the user engaging portion of the terminal unit housing to liquids without liquid entering an inner volume of the user engaging portion.

3. The mobile communications terminal unit of claim 1 further comprising a means operably associated with the mobile communications terminal unit for enabling one sending the mobile communications signal to produce a variance in the vibratory annunciation produced by the means for producing a vibratory annunciation to produce an excitation pattern of the vibratory annunciation wherein the amplitude and frequency of the vibratory annunciation may be varied with time.

4. A terminal unit of a mobile communications system for providing a non-numeric annunciation of a mobile communications signal, the terminal unit comprising:
    a terminal unit housing;
    a means for coupling the terminal unit housing to a means for receiving a mobile communications signal;

a normally inactive non-numeric annunciator means operably associated with the terminal unit housing for non-numerically annunciating a receipt of the mobile communications signal; and a means for coupling the non-numeric annunciator means to a means for receiving a mobile communications signal;

wherein the mobile communications terminal unit is constructed for use as a personal vibrator of the type used on a human body wherein the terminal unit housing comprises an exterior surface with a user engaging portion wherein the non-numeric annunciator means comprises a means operably associated with the terminal unit housing for producing a vibratory annunciation for vibrating at least the user engaging portion of the terminal unit housing in response to a receipt of the mobile communications signal by a means for receiving a communications signal whereby one sending the mobile communications signal can employ mobile communications to induce a vibration of the user engaging portion of the terminal unit housing thereby enabling one receiving the mobile communications signal to apply the user engaging portion of the terminal unit housing to a human body to provide the human body with a vibratory sensation; and wherein the user engaging portion of the terminal unit housing comprises an aperture in the terminal unit housing wherein the means for producing a vibratory annunciation vibrates the aperture in response to a receipt of the mobile communications signal by a means for receiving a mobile communications signal for enabling one receiving the mobile communications signal to insert an extremity of a human body into the aperture in the terminal unit housing in a mating relationship to provide the extremity of the human body with a vibratory sensation.

5. The mobile communications terminal unit of claim 4 wherein the aperture is lined with a resilient material whereby an extremity of a human body can be inserted into the aperture in a snug mating relationship.

6. A terminal unit of a mobile communications system for providing a non-numeric annunciation of a mobile communications signal the terminal unit comprising:

a terminal unit housing;

a means for coupling the terminal unit housing to a means for receiving a mobile communications signal;

a normally inactive non-numeric annunciator means operably associated with the terminal unit housing for non-numerically annunciating a receipt of the mobile communications signal; and a means for coupling the non-numeric annunciator means to a means for receiving a mobile communications signal;

wherein the mobile communications terminal unit is constructed for use in transmitting a command signal to a domestic animal;

a means for attaching the mobile communications terminal unit to the domestic animal comprising a collar.

7. The mobile communications terminal unit of claim 6, wherein the non-numeric annunciator means comprises an acoustic annunciator for producing an acoustic annunciation signal in response to the mobile communications signal being received by a means for receiving the mobile communications signal whereby one sending the mobile communications signal can transit an acoustic command signal to the domestic animal that wears the mobile communications terminal unit.

8. The mobile communications terminal unit of claim 6 wherein the non-numeric annunciator means comprises a means for producing a tactile annunciation in response to the mobile communications signal being received by a means for receiving the mobile communications signal whereby one sending the mobile communications signal can transmit a tactile command signal to the domestic animal that wears the mobile communications terminal unit.

9. The mobile communications terminal unit of claim 8 further comprising a means operably associated with the mobile communications terminal unit for enabling one sending the mobile communications signal to produce a variance in the tactile annunciation produced by the non-numeric annunciator means to produce a command pattern of the tactile annunciation whereby a variety of command signals can be transmitted by one sending the mobile communications signal to the domestic animal that wears the mobile communications terminal unit.

10. The mobile communications terminal unit of claim 8 wherein the means for producing a tactile annunciation in response to the mobile communications signal being received by a means for receiving the mobile communications signal comprises a means for producing a vibratory annunciation whereby one sending the mobile communications signal can transmit a vibratory command pattern to the domestic animal that wears the mobile communications terminal unit.

11. A method for employing mobile communications to enable one sending a mobile communications signal to transmit a command signal to a domestic animal comprising the steps of:

a) providing a terminal unit of a mobile communications system for imparting a non-numeric indication of the mobile communications signal wherein the terminal unit comprises a terminal unit housing, a means for receiving the mobile communications signal operably associated with the terminal unit housing, and a normally inactive non-numeric annunciator means operably associated with the terminal unit housing and operably associated with the means for receiving a mobile communications signal for non-numerically annunciating a receipt of the mobile communications signal;

b) attaching the mobile communications terminal unit to the domestic animal;

c) sending the mobile communications signal to the mobile communications terminal unit thereby causing the non-numeric annunciator means to annunciate the receipt of the mobile communications signal thereby transmitting a command signal to the domestic animal that wears the mobile communications terminal unit.

12. The command signal transmitting method of claim 11 wherein the step of providing a mobile communications terminal unit comprises providing a mobile communications terminal unit wherein the non-numeric annunciator means comprises a means for producing a tactile annunciation whereby one sending the mobile communications signal can transmit a tactile command signal to the domestic animal that wears the mobile communications terminal unit.

13. The command signal transmitting method of claim 11 wherein the step of providing a mobile communications terminal unit comprises providing a mobile communications terminal unit wherein the non-numeric annunciator means comprises a means for producing an acoustic annunciation whereby one sending the mobile communications signal can transmit an acoustic command signal to the domestic animal that wears the mobile communications terminal unit.

14. The command signal transmitting method of claim 11 wherein the step of providing a mobile communications terminal unit comprises providing a mobile communications terminal unit that further comprises a means operably associated with the mobile communications terminal unit for enabling one sending the mobile communications signal to produce a variance in the non-numeric annunciation produced by the non-numeric annunciator means thereby enabling one sending the mobile communications signal to produce a command pattern of the non-numeric annunciation whereby a variety of command signals can be transmitted by one sending the mobile communications signal to the domestic animal that wears the mobile communications terminal unit.

\* \* \* \* \*